United States Patent
Hasselgruber et al.

(10) Patent No.: US 6,592,168 B2
(45) Date of Patent: Jul. 15, 2003

(54) CONVERTIBLE VEHICLE ROOF MOVABLE BETWEEN CLOSED AND OPEN POSITIONS

(75) Inventors: Andreas Hasselgruber, Eberdingen-Nussdorf (DE); Andreas Brauns, Hamburg (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/093,778

(22) Filed: Mar. 8, 2002

(65) Prior Publication Data

US 2002/0125731 A1 Sep. 12, 2002

(30) Foreign Application Priority Data

Mar. 12, 2001 (DE) .......................................... 101 12 092

(51) Int. Cl.⁷ .................................................. B60J 10/10
(52) U.S. Cl. ............... 296/107.01; 296/108; 296/107.08
(58) Field of Search ........................ 296/107.01, 107.09, 296/108, 136, 121, 107.08, 76, 107.13, 107.17

(56) References Cited

U.S. PATENT DOCUMENTS

| | | | | | |
|---|---|---|---|---|---|
| 5,042,868 A | * | 8/1991 | Nothaft et al. | ......... | 296/107.09 |
| 5,490,709 A | * | 2/1996 | Rahn | ......................... | 296/108 |
| 5,520,432 A | * | 5/1996 | Gmeiner et al. | ........ | 296/107.01 |
| 5,551,743 A | * | 9/1996 | Klein et al. | .................. | 296/136 |
| 5,584,522 A | * | 12/1996 | Kerner et al. | ................ | 296/108 |
| 5,743,587 A | * | 4/1998 | Alexander et al. | .......... | 296/108 |
| 5,772,275 A | * | 6/1998 | Tokarz | ........................ | 296/108 |
| 5,779,299 A | * | 7/1998 | Purcell et al. | ............... | 296/121 |
| 5,785,375 A | * | 7/1998 | Alexander et al. | .......... | 296/108 |
| 5,823,606 A | * | 10/1998 | Schenk et al. | ......... | 296/107.08 |
| 5,833,300 A | | 11/1998 | Ruske | | |
| 5,975,619 A | * | 11/1999 | Dettling et al. | ......... | 296/107.08 |
| 6,033,008 A | * | 3/2000 | Mattila | ........................ | 296/121 |
| 6,039,383 A | * | 3/2000 | Jambor et al. | ............... | 296/108 |
| 6,062,625 A | * | 5/2000 | Elelnrieder et al. | ......... | 296/108 |
| 6,092,335 A | * | 7/2000 | Queveau et al. | ....... | 296/107.08 |
| 6,131,988 A | * | 10/2000 | Queveau et al. | ....... | 296/107.17 |
| 6,227,605 B1 | * | 5/2001 | Weisser et al. | ............. | 296/121 |
| 6,352,298 B1 | * | 3/2002 | Hayashi et al. | ......... | 296/107.08 |
| 6,357,815 B1 | * | 3/2002 | Queveau et al. | ............... | 296/76 |
| 6,390,531 B1 | * | 5/2002 | Schutt | .................... | 296/107.13 |
| 6,419,294 B2 | * | 7/2002 | Neubrand | .............. | 296/107.08 |
| 6,419,295 B1 | * | 7/2002 | Neubrand | .............. | 296/107.07 |
| 2001/0033090 A1 | * | 10/2001 | MacFarland | ........... | 296/107.09 |
| 2001/0042991 A1 | * | 11/2001 | Schuler et al. | ......... | 296/107.08 |
| 2001/0045759 A1 | * | 11/2001 | Russke | ................... | 296/107.17 |
| 2002/0125733 A1 | * | 9/2002 | Kinnanen | .............. | 296/107.17 |

FOREIGN PATENT DOCUMENTS

| | | | |
|---|---|---|---|
| DE | 196 42 154 | | 4/1994 |
| DE | 195 39 086 C1 | | 10/1996 |
| GB | 2 194 759 A | | 3/1988 |
| WO | WO00/54997 | * | 9/2000 |
| WO | WO01/79011 | * | 10/2001 |
| WO | WO01/85480 | * | 11/2001 |

\* cited by examiner

Primary Examiner—Kiran Patel
(74) Attorney, Agent, or Firm—Klaus J. Bach

(57) ABSTRACT

In a convertible vehicle roof, which is movable between closed and open positions, and which includes front and rear roof parts which are joined by a kinematic linkage arrangement by which the roof parts, which, in a closed position, are disposed closely adjacent each other, are, upon opening of the roof, first linearly moved apart before the front roof part is pivoted below the rear roof part for placement in a storage compartment.

7 Claims, 3 Drawing Sheets

CONVERTIBLE VEHICLE ROOF MOVABLE BETWEEN CLOSED AND OPEN POSITIONS

BACKGROUND OF THE INVENTION

The invention relates to a convertible vehicle roof, which is movable between a closed position and an open position and which includes at least two roof parts which, in the closed position, are arranged in the longitudinal vehicle direction behind one another. They are interconnected by linkages whereby the front roof part is pivoted below the rear roof part during opening the roof.

DE 196 42 154 A1 discloses a hardtop roof including three roof parts which are joined by a kinematic chain structure such that they are disposed, in the longitudinal vehicle direction, directly behind one another when the vehicle roof is closed and are stored in a storage compartment behind the passenger compartment when the vehicle roof is open. The rear roof part is connected to the vehicle body, the intermediate roof part is connected to the rear roof part by a four joint kinematic linkage, and the front roof part is connected to the intermediate roof part by means of a pivot joint. For transferring the vehicle roof from the closed position to the open position, in which the roof parts are stored in a rear storage compartment, the intermediate roof part is moved into a parallel position below the rear roof part and the front roof part is pivoted below the intermediate roof part. The whole roof part pack comprising the three roof parts disposed on top of one another is then moved into the rear storage compartment.

It is problematic however that, in a closed position, the adjacent end faces of the front roof part and the intermediate roof part need to be disposed closely adjacent each other to provide for a tight connection but, during the relative pivot movement, collisions in the area of the adjacent end faces need to be prevented in order to ensure smooth and trouble-free operation of the vehicle roof over a long life. The linkage kinematics and the adjacent edges of the front and the intermediate roof parts are therefore subject to design limitations which reduce the number of design possibilities.

It is the object of the present invention to provide a convertible vehicle roof which consists of at least two relatively movable roof parts that can be reliably moved between closed and open positions over a long life period.

SUMMARY OF THE INVENTION

In a convertible vehicle roof, which is movable between closed and open positions, and which includes front and rear roof parts which are joined by a kinematic linkage arrangement by which the roof parts, which, in a closed position, are disposed closely adjacent each other, are, upon opening of the roof, first linearly moved apart before the front roof part is pivoted below the rear roof part for placement in a storage compartment.

In order to provide for these different relative movements, which are uncoupled from each other, the joint kinematics between the front and the rear roof part includes a slide structure, which permits the translatory displacement, and a pivot joint, which is supported by the slide structure and permits the pivot movement between the front and the rear roof parts. The timely subsequent translatory and pivot movements may be achieved by a corresponding control of the joint kinematics or one or respectively, several control members.

The sequence of translatory and pivot movement is preferably initiated by a single control member which preferably pivots a rotatable (pivot) component on which a lever and control arm arrangement is mounted, which converts the rotation of the rotatable part into a translatory and pivot movement of the front roof part relative to the rear roof part. The rotatable part is preferably in the form of a double arm rocker, to which two transfer links are connected, such that a first transfer link operates an exclusively linear slide member and the second transfer link is connected to a connecting arm extending between the front and the rear roof parts. The linear slide member is also connected to this connecting arm and is adapted to initiate translatory movement of the front roof part without pivoting it. The second transfer link is adapted, upon further rotation of the rocker, to pivot the connecting arm about a pivot axis in such a way that the front roof part is pivoted into a position below the rear roof part.

The pivot movements of the two transfer links, which are pivotably coupled to the rocker, are so tuned that, at the beginning of opening movement—when the front roof part performs an exclusively translatory movement with respect to the rear roof part—both transfer links perform, as a result of the pivot movement of the rocker, an about equal translatory forward movement, whereby the exclusively translatory displacement of the front roof part is achieved. Upon further rotation of the rocker, the pivot movement of the second transfer link is more pronounced than that of the first transfer link. This is achieved by an arrangement wherein the second transfer link is connected to the rocker at a greater distance from the axis of rotation of the rocker than the first transfer link whereby the front roof part is caused to a pivot. Because of the smaller distance of the first transfer link connection to the rocker from the rocker axis with respect to the second transfer link pivot connection, which is at a greater distance from the rocker axis of rotation, the second transfer link transfers a larger control movement to the connecting arm than the first transfer link which is connected to the connecting arm indirectly by way of the slide member.

The invention will become more readily apparent from the following description of preferred embodiments thereof on the basis of the accompanying drawings.

DESCRIPTION A PREFERRED EMBODIMENT

Figure 1:
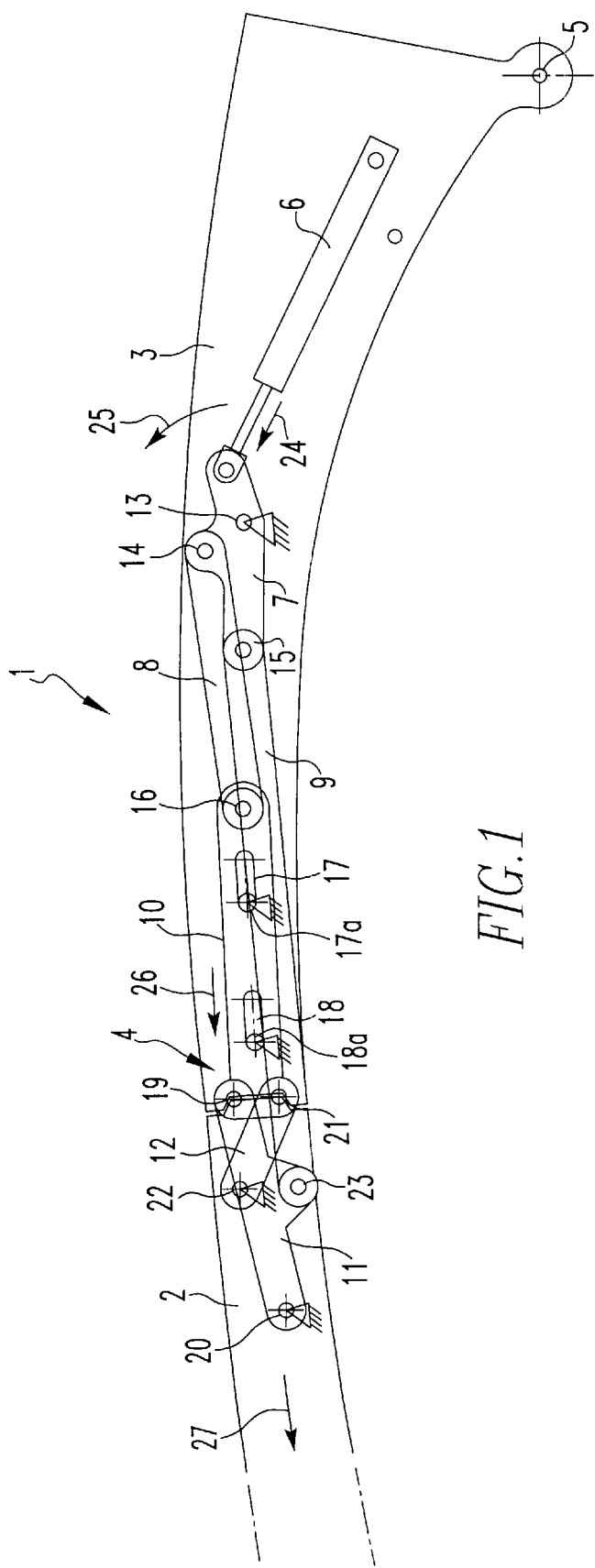
FIG. 1 shows a convertible vehicle roof with front and rear roof parts, which are kinematically coupled and which are movable between a closed position as shown in FIG. 1 and an open position.

Identical components are designated in the various drawings by the same reference numerals.

The convertible vehicle roof 1 as shown in the figures is in the form of a hardtop. It comprises a front roof part 2, which is disposed adjacent the windshield of the vehicle, and a rear roof part 3, which is disposed directly adjacent to, and behind, the front roof part 2 when the vehicle roof 1 is in a closed position. The front roof part 2 is coupled to the rear roof part 3 by way of a kinematic linkage 4. With the kinematic linkage 4, the front roof part 2 can be longitudinally displaced from the rear roof part 3 and pivoted, wherein the two movements are performed independently from each other and in a timely subsequent manner. The rear roof part 3 is connected by a pivot joint 5 either to the vehicle body or to another linkage such that the rear roof part 3 can be moved or pivoted relative to the vehicle body in order to transfer the vehicle roof into a storage compartment disposed behind the passenger compartment of the vehicle.

The kinematic linkage 4 between the front and the rear roof parts 2 and 3 is connected exclusively to these roof parts. The kinematic linkage 4 is operated by an actuator 6, which is shown in the example to be a hydraulic operating cylinder and which is supported on the rear roof part 3 preferably near the pivot joint 5. The kinematic linkage 4 comprises a plurality of components 7 to 12 of which the component 7 is a double arm rocker, the components 8 and 9 are transfer links, the component 10 is a slide member and the components 11 and 12 are connecting or, respectively, stabilization arms extending between the front and the rear roof parts 2 and 3. The rocker 7 is supported by the rear roof part 3 by way of a pivot joint 13, which is disposed between the two arms of the rocker 7. The actuator 6 is connected to one arm of the rocker 7. The other arm of the rocker 7 includes a joint 15 by which the transfer link 9 is pivotally connected to the rocker 7. Near the center of the rocker 7, there is another joint 14 arranged in spaced relationship from the joint 13 of the rocker 7 where the transfer link 8, which extends between the rocker 7 and the slide member 10, is connected to the rocker 7.

The joints 14 and 15 of the transfer links 8 and 9 have different distances from the pivot joint 13 by which the rocker 7 is supported on the rear roof part 3. The distance of the joint 15 from the pivot axis is at least twice the distance of the joint 14 from the pivot joint 13 of the rocker 7.

The first transfer link 8 transfers the pivot movement of the rocker 7 to the slide member 10 with which the transfer link 8 is pivotally connected by a joint 16. Since the transfer link 8 is pivotally linked to the rocker and also to the longitudinally movable slide member 10, the pivot movement of the rocker 7 is converted to a translatory movement of the slide member 10. The linear support of the slide member 10 on the rear roof part 3 is achieved by way of two guide slots 17 and 18, which are formed in the slide member 10. The guide slots 17 are disposed one after the other in longitudinal alignment and a pin, which is firmly connected to the rear roof part 3, extends into each of the guide slots 17. In this way, the slide member 10 can be slidably moved between two end positions in which the pins extending into the guide slots 17, 18 abut the end faces of the respective guide slots.

At its end adjacent the front roof part 2, the slide member 10 is connected, by way of a joint 19, to one end of the connecting arm 11, whose other end is pivotally connected to the front roof part 2 by way of a joint 20. The stabilization arm 12 is also connected pivotally with one end to the slide member 10 by a joint 21 which is arranged at the front end of the slide member 10 parallel to the joint 19 and, with its other end, to the front roof part 2 by a joint 22.

The connecting arm 11 further includes a joint 23 by way of which the transfer link 9 transfers the movement of the rocker 7 directly to the connecting arm 11. The joint 23 is arranged on the connecting arm 11 at a distance from the pivot joint 20, which is about half that of the joint 19, by which the connecting arm 11 is mounted to the slide member 10.

When the actuator 6 is extended in the direction of the arrow 24, the rocker 7 is pivoted about its pivot axis 13 in the direction as indicated by arrow 25. This pivot movement is converted by way of the transfer link 8 into a linear slide movement of the slide member 10 as indicated by arrow 26. The slide direction is about in the plane of the closed vehicle roof. The linear displacement of the slide member 10 is transmitted, by way of the connecting arm 11 and the stabilization arm 12 to the front roof part 2, which is displaced thereby in the direction of the arrow 27 forwardly toward the windshield of the vehicle.

Figure 2:
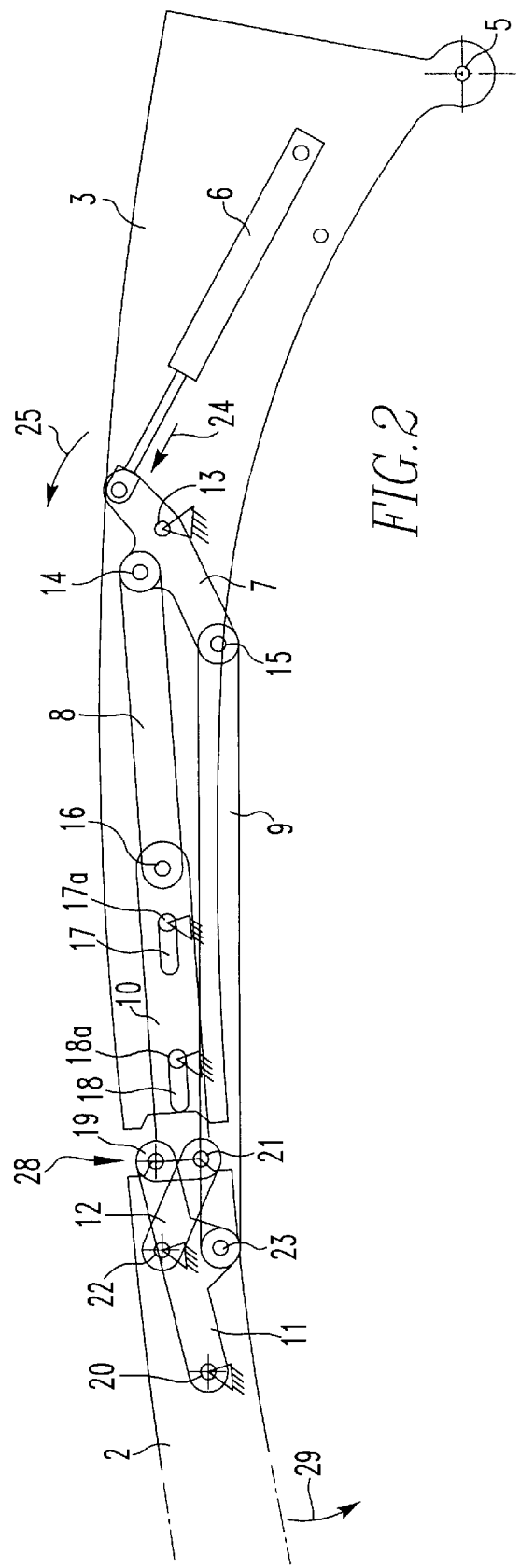
FIG. 2 shows the vehicle roof at the beginning of the opening movement in an intermediate position between the closed and open positions, wherein the front and rear roof parts are longitudinally displaced from each other.

The linear displacement occurs at the beginning of the opening movement of the vehicle roof to the intermediate position of the front roof part as shown in FIG. 2. In this position a gap 28 is established between the front roof part 2 and the rear roof part 3. The gap 28 has a width, which is determined by the maximal displacement of the front roof part as permitted by the length of the guide slots 17 and 18. The gap 28 between the front and the rear roof parts 2 and 3 offers the advantage that the front roof part 2 can be pivoted into a position below the rear roof part 3 (see FIG. 3) without contacting portions of the rear roof part, for transfer of the roof into a storage space behind the passenger compartment. Because of the gap 28 formed between the adjacent face areas of the front and rear roof parts 2 and 3 no collisions occur even with a large pivot movement of the front roof part by about 180° into a position below the rear roof part. That means that the front roof part can be transferred to its storage location below the rear roof part without restriction of movement.

During the linear displacement of the front roof part 2 relative to the rear roof part 3—the transition from FIG. 1 to FIG. 2—the extent of the linear movement is determined by the movement of the transfer link 8 as projected into the linear displacement direction. During pivoting of the rocker 7 in the direction of the arrow 25, the transfer link 8 performs at the joint 14 with the rocker 7 a partial circular motion which, projected in the translatory direction, determines the extent of the linear displacement. At the same time, also the transfer link 9 which is also connected to the rocker 7 by the pivot joint 15 is actuated by the pivot movement of the rocker 7 and causes a movement of the joint 23 of the transfer link 9 on the connecting arm 11 in the direction of the arrow 27. The movements of the joints 14 and 15 in a forward direction are tuned with respect to each other in such a way that the forward sliding movements in the direction of arrow 27 generated thereby are about the same for the joints 19 and 23 of the connecting arm 11, so that the front roof part 2 is moved forwardly without being pivoted.

Figure 3:
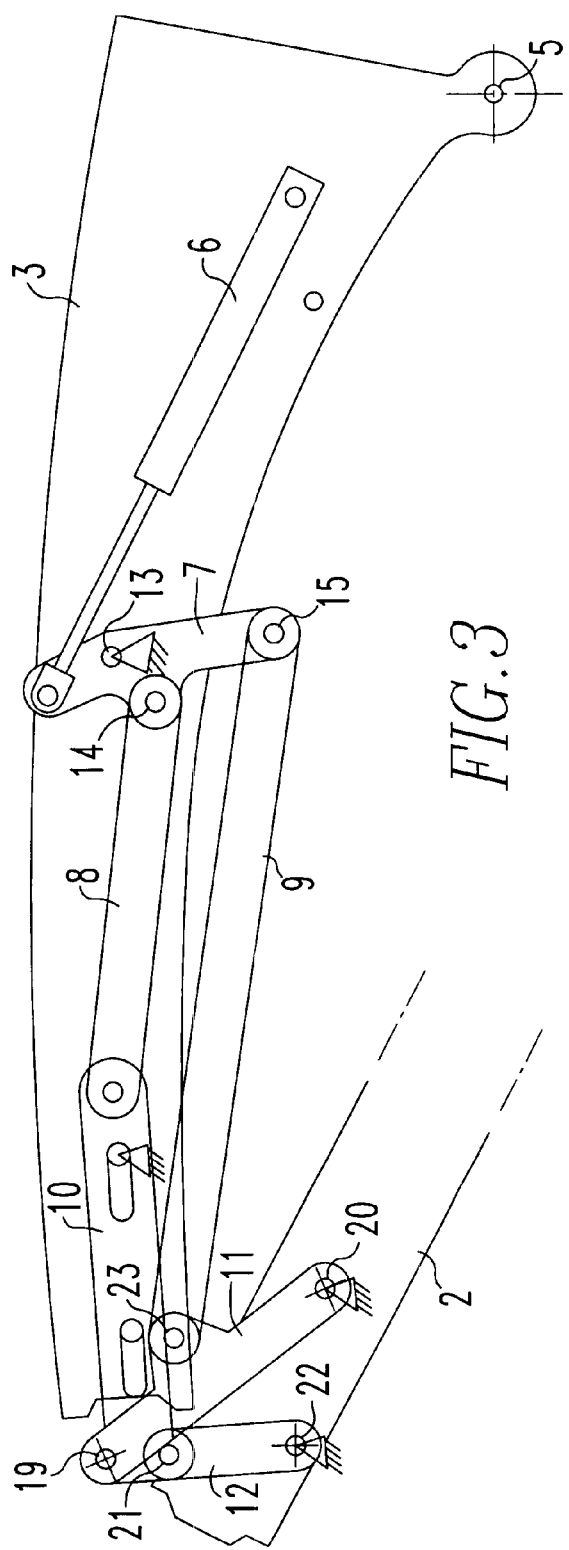
FIG. 3 shows the vehicle roof in a further advanced intermediate position in which the front roof part is, subsequent to the translatory displacement, pivoted into a position below the rear roof part.

When the front roof part 2 has reached the intermediate position as shown in FIG. 2, wherein a gap 28 is formed between the front and rear roof parts 2 and 3, the rocker 7 is farther pivoted in the direction of the arrow 25 by further extending the actuator 6. As a result, the front roof part 2 is pivoted about the joints 19 and 21 in the direction of the arrow 29 into a position below the rear roof part 3 as shown in FIG. 3. In this position, the inner roof sides of the front and rear roof parts face each other. The pivot movement about the joints 19 and 21 is essentially caused by a movement of the transfer link 9, which, by the pivoting of the rocker 7 in the direction of the arrow 25 causes backward movement of the joint 15 and the link 9 toward the pivot joint 5 of the rear roof part 3. The connecting arm is pulled back by the link 9, whereby the front roof part 2 is pivoted into the position as shown in FIG. 3.

During this pivot movement of the front roof part 2, the slide member 10 remains in its extended position in which it projects beyond the front end of the rear roof part 3.

What is claimed is:

1. A convertible vehicle roof (1) movable between closed and open including at least front and rear roof parts (2,3) are disposed, in the longitudinal vehicle direction on after the other when said vehicle roof (1) is closed, a kinematic linkage arrangement (4) connected to said roof parts (2,3) for pivoting said front roof part (2) about a pivot axis disposed between said front and rear roof parts (2, 3) to a position below said rear roof part (3), said kinematic linkage arrangement (4) including a slide member (10) disposed operatively between said rear and said front roof parts (3, 2) and having guide slots (17, 18), guide pins (17a, 18a) mounted on said rear roof part (3) 50 as to extend through said guide slots (17, 18) for slideably supporting said slide member (10) on said rear roof part (3) and a connecting arm (11) having first and second ends and being pivotally supported with said first end thereof on said slide member (10), and being pivotally connected, with its second end to said front roof part (2) for laterally linearly moving said front and rear roof parts (2, 3) apart to permit pivoting said front roof part (2) about said pivot axis below said rear roof part (3).

2. A convertible vehicle roof (1) according to claim 1, wherein said front roof part (2) is laterally linearly movable away from said rear roof part (3) in the direction toward the vehicles windshield.

3. A convertible vehicle roof (1) according to claim 1, wherein said connecting arm (11) is connected to said slide member (10) by means of a pivot joint (19).

4. A convertible vehicle roof (1) according to claim 1, wherein a stabilization arm (12) having first and second ends is pivotally connected with said first end thereof to said slide member (10) a d with its second end, to said front roof part (2) in the area thereof opposite said slide member (10).

5. A convertible vehicle roof (1) according to claim 1, wherein a rocker (7) is pivotally supported on said rear roof part and an actuator (6) is mounted on said rear roof part and connected to said rocker (7) for actuating said rocker (7), and first and second transfer links (8 and 9) are connected with one of their ends t said rocker (7), said first transfer link (8) providing for the linear movement said slide member (10) and said second transfer link (9) providing for the pivot movement of said front roof part relative to said rear roof part.

6. A convertible vehicle roof (1) according to claim 5, wherein said first transfer link (8) is connected with its other end to said glide member (10) for linearly moving said slide member (10).

7. A convertible vehicle roof according to claim 5, wherein said second transfer link (9) is pivotally connected with its other end to said connecting arm (11) for pivoting said connecting arm (11).

* * * * *